(12) United States Patent
Engvall et al.

(10) Patent No.: US 6,439,341 B1
(45) Date of Patent: Aug. 27, 2002

(54) APPARATUS FOR MONITORING LOADING OF A LIFT

(75) Inventors: David P. Engvall; Stanley R. Sumsion, both of St. Joseph, MO (US)

(73) Assignee: Snorkel International, Inc., St. Joseph, MO (US)

( * ) Notice: Subject to any disclaimer, the term of this patent is extended or adjusted under 35 U.S.C. 154(b) by 0 days.

(21) Appl. No.: 09/783,488

(22) Filed: Feb. 14, 2001

(51) Int. Cl.[7] ................................................ B66F 11/04
(52) U.S. Cl. .......................................... 182/18; 182/2.11
(58) Field of Search ........................... 182/18, 2.1–2.11, 182/63.1, 69.4, 69.6

(56) References Cited

U.S. PATENT DOCUMENTS

| | | | |
|---|---|---|---|
| 2,873,341 A | 2/1959 | Kutsay | |
| 3,365,689 A | 1/1968 | Kutsay | |
| 3,695,096 A | 10/1972 | Kutsay | |
| 3,724,679 A | 4/1973 | Brownell et al. | |
| 3,952,289 A | 4/1976 | Baligant | |
| 3,952,879 A | 4/1976 | Grove | |
| 4,031,964 A | * 6/1977 | Takahashi | |
| 4,068,773 A | 1/1978 | Downing et al. | |
| 4,093,091 A | 6/1978 | Gregg et al. | |
| 4,140,010 A | 2/1979 | Kulpmann et al. | |
| 4,179,010 A | * 12/1979 | Ashworth | |
| 4,308,929 A | 1/1982 | Estavoyer | |
| 4,456,093 A | 6/1984 | Finley et al. | |
| 4,463,614 A | 8/1984 | Lee | |
| 4,732,286 A | 3/1988 | Koenig | |
| 4,799,562 A | * 1/1989 | Burrows | |
| 5,224,815 A | 7/1993 | Abels et al. | |
| 5,259,253 A | 11/1993 | Wirth et al. | |
| 5,259,259 A | 11/1993 | Inokuchi et al. | |
| 5,359,516 A | 10/1994 | Anderson | |
| 5,557,526 A | 9/1996 | Anderson | |
| 5,591,943 A | 1/1997 | Cheng | |
| 5,913,379 A | 6/1999 | Young, et al. | |
| 6,044,991 A | 4/2000 | Freudenthal et al. | |

FOREIGN PATENT DOCUMENTS

| | | |
|---|---|---|
| EP | 0 017 581 | 8/1984 |
| EP | 0 103 360 | 4/1988 |
| FR | 2 509 464 | 7/1982 |
| GB | 2 101 753 | 1/1983 |

OTHER PUBLICATIONS

Standard Internally Gaged STUDS, Strainsert, West Conshohocken, Pennsylvania, Admitted Prior Art.
Forged Eye Nuts, http://catalog.thecrosbygroup.com, p. 143, West Conshohocken, Pennsylvania, Admitted Prior Art.
Internally Gaged Force Transducers, Strainsert, West Conshohocken, Pennsylvania, Admitted Prior Art.

* cited by examiner

*Primary Examiner*—Alvin Chin-Shue
(74) *Attorney, Agent, or Firm*—Senniger, Powers, Leavitt & Roedel (57) ABSTRACT

A load lift comprising a lifter and a linkage on the lifter carrying a load support for movement therewith to different elevations. The linkage is a four-member linkage which includes a first vertical side member carried by the lifter, a second vertical side member carrying the load support, a third member constituting an upper member of the linkage pivotally connected to the first and second members, and a fourth member constituting a lower member of the linkage pivotally connected to the first and second members. An interconnection between the first and second members holds up the second member and load support and is thereby subject to loading on account of the load support and load thereon. Instrumentation senses the loading on the linkage indicative of the load on the load support.

3 Claims, 13 Drawing Sheets

APPARATUS FOR MONITORING LOADING OF A LIFT

BACKGROUND OF THE INVENTION

This invention relates to apparatus for monitoring the loading of a lift, such as the loading of the work platform of an aerial work platform lift, and the loading of a forklift; and more particularly for sensing the load on the work platform of the aerial work platform lift or the tines of the forklift.

As to the monitoring of the loading of the work platform of an aerial work platform lift, reference may be made to U.S. Pat. No. 5,913,379 of Paul E. Young and David P. Engvall issued Jun. 22, 1999 entitled Articulated Aerial Work Platform System for a disclosure of the type of aerial work platform lift in which the monitoring apparatus or "load sensor mounting" apparatus of this invention is incorporated, with the understanding that the apparatus of the invention may be incorporated generally in aerial work platform lifts other than that shown in said U.S. Pat. No. 5,913,379, which is incorporated herein by reference. A problem which has existed with regard to such lifts has been that of detecting overloading (i.e. excessive weight) on the work platform of the lift, so that unsafe conditions due to overloading may be avoided. Excessive weight may be due to the weight of the workman (or workmen) standing on the work platform plus equipment and items being used, additive to the weight of the work platform itself. Attempts to solve this problem have been made; see, for example such prior U.S. Pat. No. as 3,952,879 issued Apr. 27, 1976 entitled Overload Control for Lifting Boom and U.S. Pat. No. 4,456,093 issued Jun. 26, 1984 entitled Control System for Aerial Work Platform Machine and Method of Controlling an Aerial Work Platform Machine. Other attempts have involved the use of multiple load sensors at various locations on the work platform. However, these systems are expensive and not particularly accurate. This invention is regarded as representing an improvement over such systems and what is disclosed in such prior U.S. Patents.

In addition to being applicable to monitoring the loading of the work platform of an aerial work platform lift, the invention is also applicable to the monitoring of the loading of other lifts, in particular a forklift, and especially a type of forklift referred to as a rough terrain forklift, such as used on construction sites to lift construction materials, for example. In such usage, the forklift may encounter the problem of a load being picked up on the tines of the forklift in a way as to result in a dangerous situation which, if not remedied, may cause the forklift to tip over. An adjunct of the invention involves detection of a potential tip-over condition.

Reference may also be made to the following U.S. Patents as of interest re the forklift application of the invention and re other potential applications thereof:

| U.S. Pat. No. | Date | Title |
| --- | --- | --- |
| 3,724,679 | April 3, 1973 | Indicator or Control for Cranes |
| 4,068,773 | January 17, 1978 | Lift Vehicle with Fail-Safe Overload Protection System |
| 4,093,091 | June 6, 1978 | Load Movement Sensing System for Lift Trucks |
| 5,557,526 | September 17, 1996 | Load Monitoring System for Booms |

In general, a load lift of this invention comprises a lifter (e.g. the boom of an aerial work platform lift, the lifter of a forklift, or the like) and a linkage on the lifter carrying a load support (e.g. the aerial work platform, the tines of the forklift, or the like) for movement therewith to different elevations. The linkage comprises a first member carried by the lifter, a second member carrying the load support, said first and second members constituting side members of the linkage extending generally vertically, a third member constituting an upper member of the linkage pivotally connected to the first and second members, and a fourth member constituting a lower member of the linkage pivotally connected to the first and second members. An interconnection between said first and second members holds up said second member and load support. Instrumentation is provided for sensing the load on the load support.

This invention is also directed to a load sensor mounting per se (a unit for incorporation in a lift). The mounting generally comprises the linkage and instrumentation described above.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
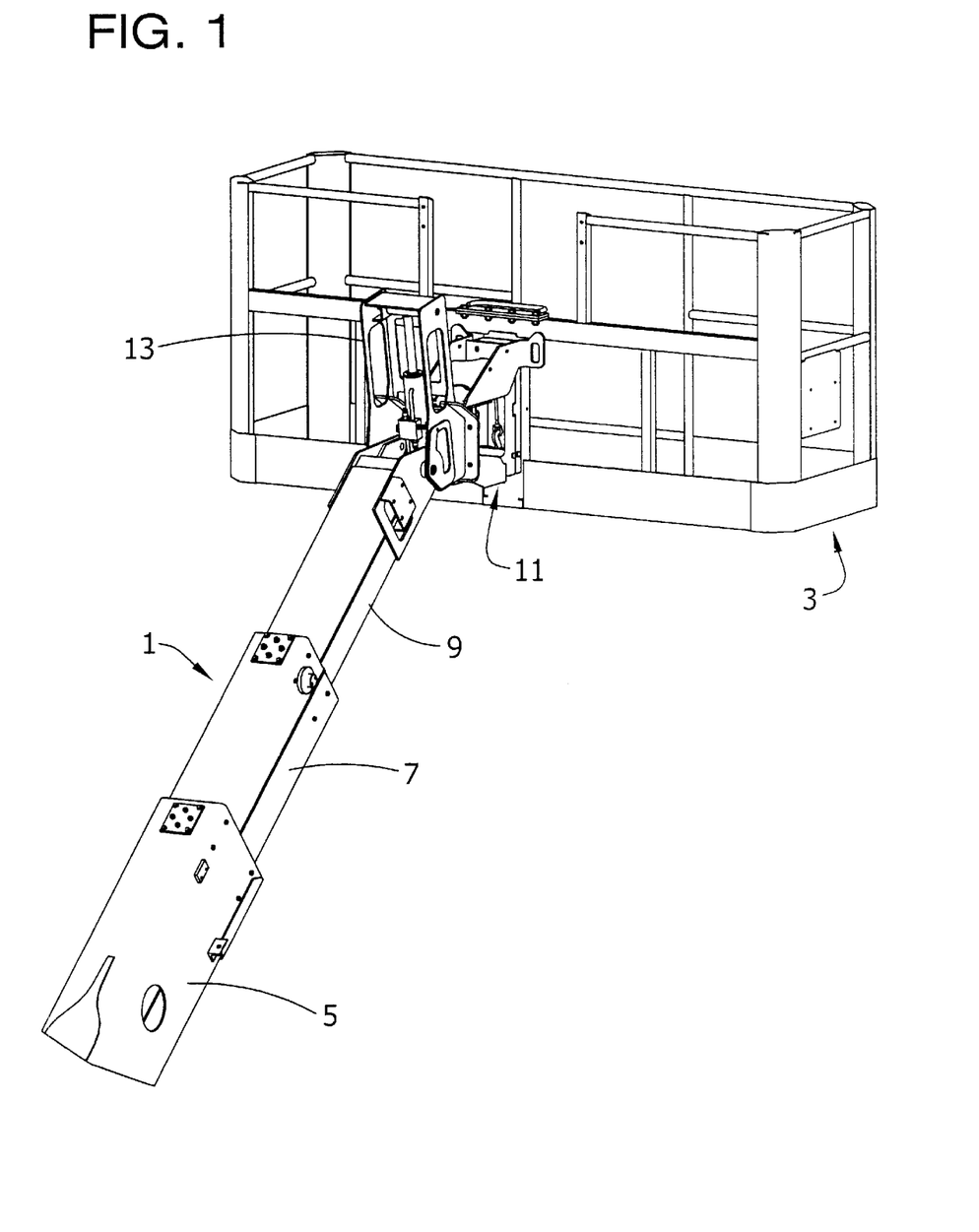
FIG. 1 is a view in perspective showing the extensible boom and work platform of an aerial work platform lift incorporating the load sensor mounting of this invention, the boom being shown in a longitudinally extended upwardly angled position.
Figure 2:
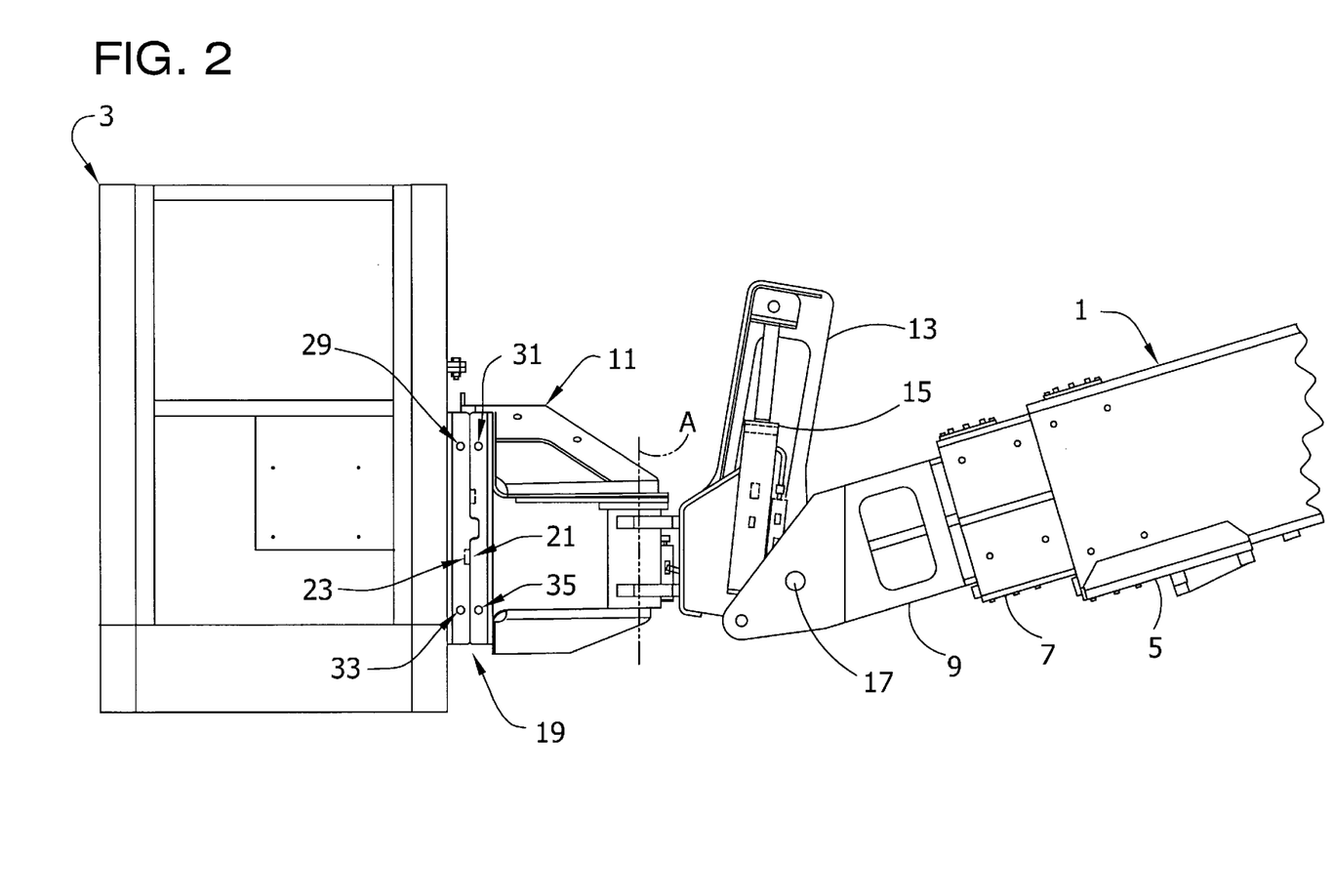
FIG. 2. is a side elevation of the boom work platform and load sensor mounting of FIG. 1, the boom being shown in a retracted condition and in a downwardly angled position.
Figure 3:
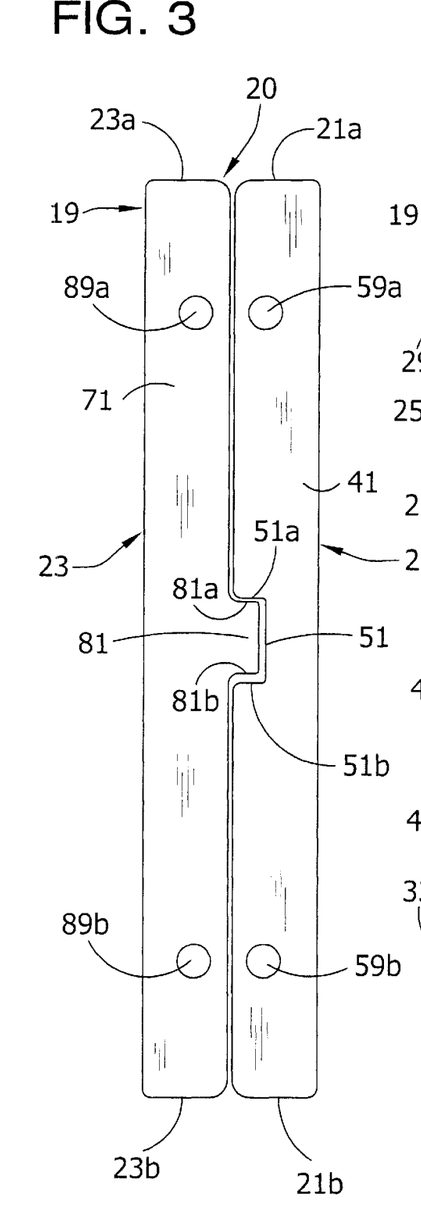
FIG. 3 is a view in elevation of one side of the load sensor mounting per se, the other side being a mirror image thereof.

Referring first to FIGS. 1 and 2 of the drawings, there is generally indicated at 1 the boom of an aerial work platform lift such as disclosed in the aforesaid U.S. Pat. No. 5,913, 379, for example, the boom constituting in a broad sense a lifter for the load support constituted by the work platform, the latter being identified in its entirety by the reference numeral 3. The boom 1 and work platform 3 are conventional, the boom being shown as the conventionally telescopically extensible boom comprising base section 5, mid-section 7 and tip or end 9. The end 9 of the boom includes a framework 11 (e.g., a rotation bracket assembly) carried by leveling apparatus 13 including a hydraulic cylinder 15 for pivotal movement of the framework 11 about a generally vertical axis indicated generally at A—A and for further pivotal movement with apparatus 13 about a generally horizontal axis 17 for maintaining the framework 11 in a position for keeping the work platform 3 level as the boom 1 pivots up and down and for enabling the work platform to be pivoted from side-to-side on axis 17. All this is standard and well-known at this time; reference may be made to said U.S. Pat. No. 5,913,379 for details. The invention resides in means mounting the work platform 3 on the end of the boom; which means may be referred to as noted as the "load sensor mounting" for the work platform, and which is referred to in its entirety by the reference numeral 19. As shown in FIG. 2, means 19 mounts the work platform 3 on the framework 11, but it will be understood that framework 11 could be eliminated and means 19 used to mount the work platform directly on the leveling apparatus 13.

Figure 4:
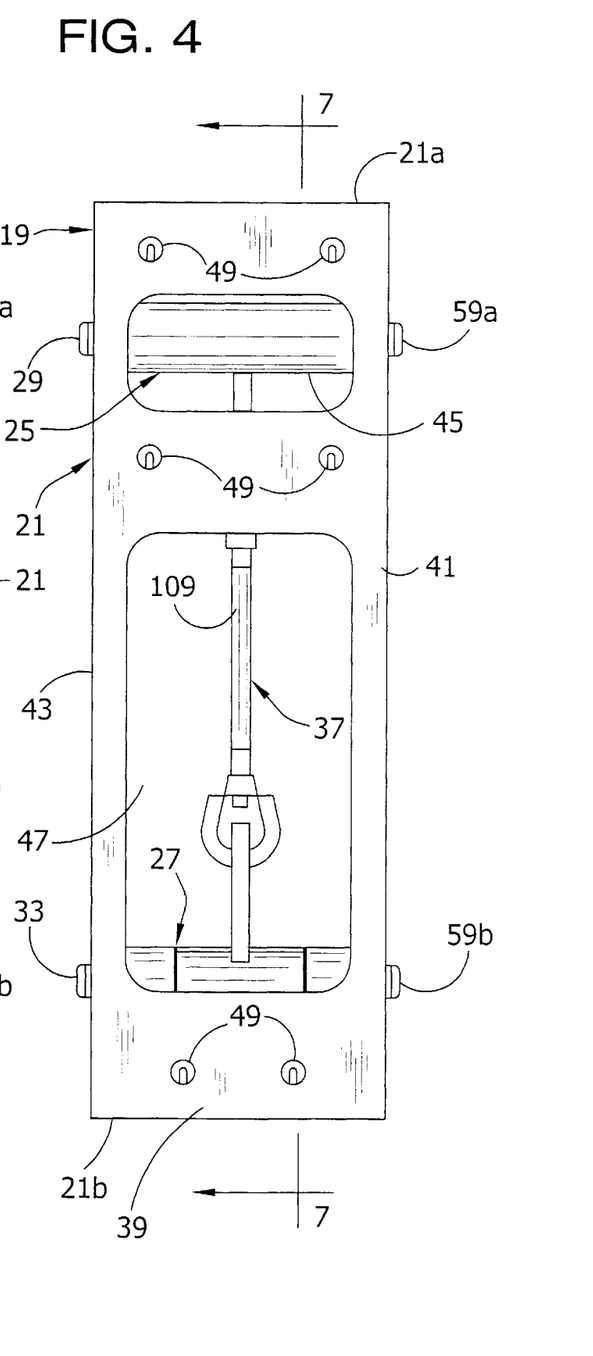
FIG. 4 is a view in elevation of one face of the load sensor mounting, the other face appearing the same.
Figure 5:
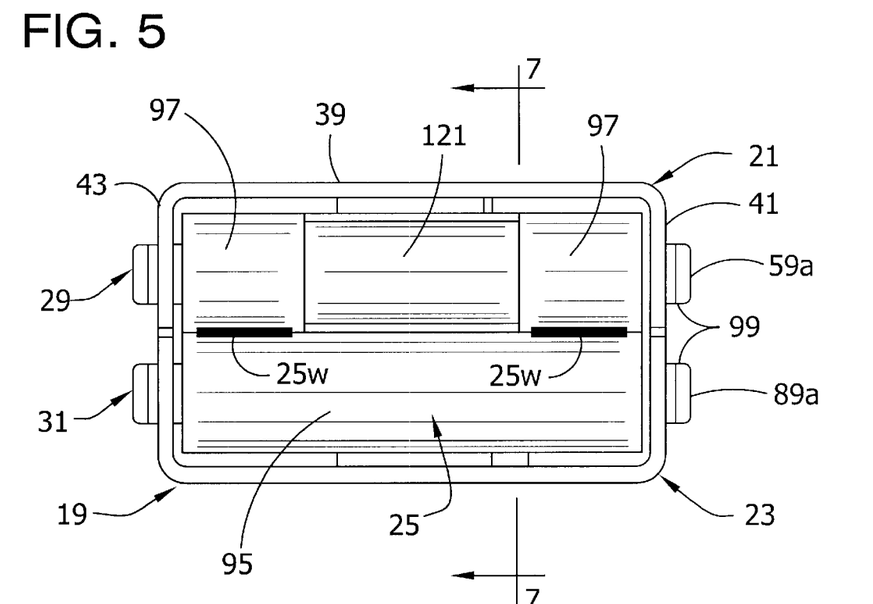
FIG. 5 is a top plan view of the load sensor mounting.
Figure 6:
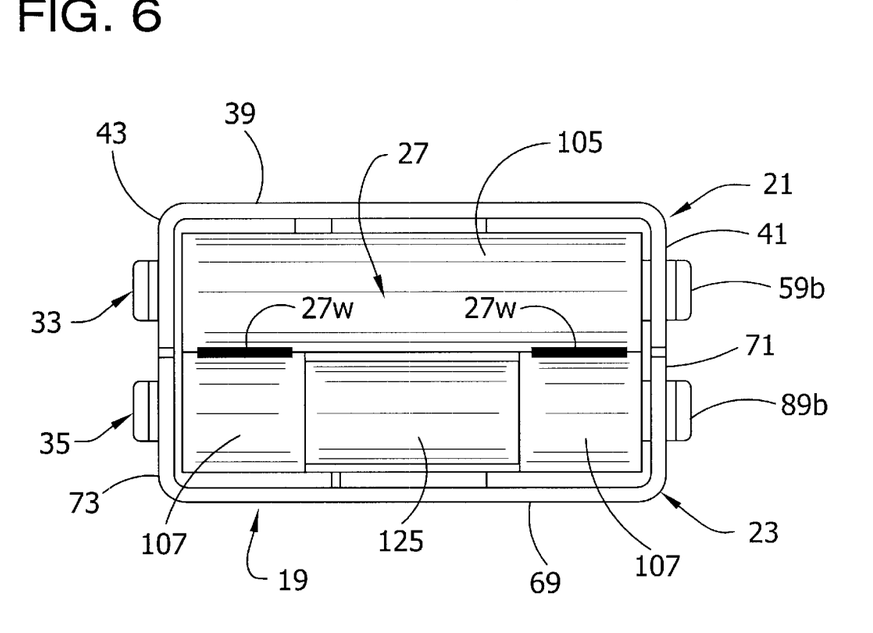
FIG. 6 is a bottom view of the load sensor mounting.

In general, the load sensor mounting 19 comprises a linkage, generally designated 20, which includes a first member 21 carried by the framework 11 on the end of the boom 1 (the lifter), a second member 23 carrying the work platform 3 (the load support), said members 21 and 23 constituting side members of the linkage, and third and fourth members 25 and 27 constituting upper and lower members of the linkage. The stated first and second members extend generally vertically in close proximity one to the other, member 21 having upper and lower ends 21a, 21b, and member 23 having upper and lower ends 23a, 23b. The third (upper) member 25 is pivotally connected to the first and second members 21 and 23 adjacent their upper ends as indicated at 29 and 31 (FIG. 5) and the fourth member is pivotally connected to the first and second members 21 and 23 adjacent their lower ends as indicated at 33 and 35 (FIG. 6). At 37 (FIG. 4) is indicated in its entirety an interconnection between the first and second members 21 and 23 functioning to hold up said second member 23 and the work platform 3 (the load support), the interconnection 37 thereby being subject to loading on account of holding up the work platform (the load support) and the load thereon. As will be described in detail later, instrumentation is provided for sensing the load on the linkage 20 indicative of the loading on the work platform 3.

Figure 7:
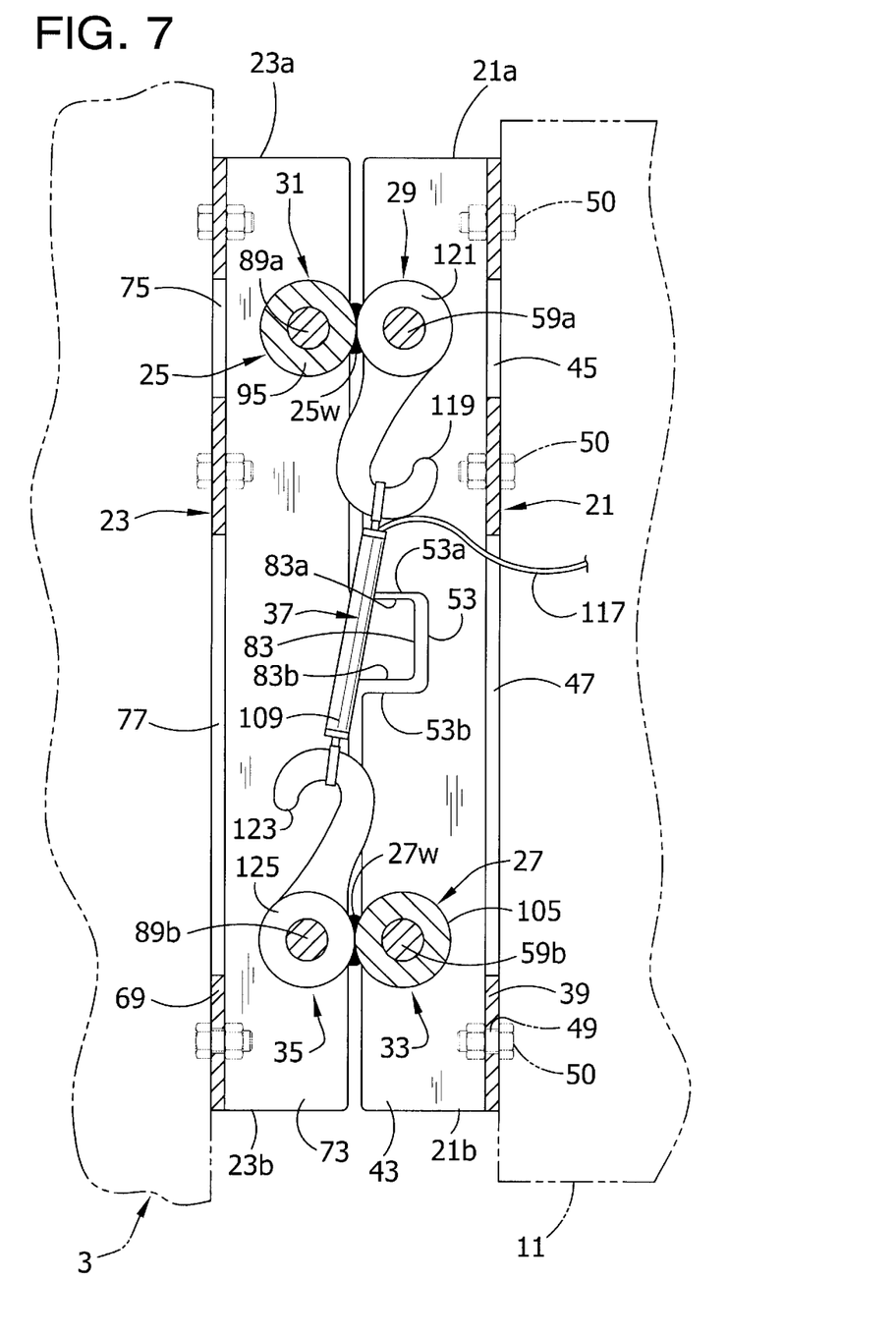
FIG. 7 is a vertical section taken generally on line 7—7 of FIGS. 4 and 5 showing in phantom certain framework on the end of the boom (to which one side of the load sensor mounting is fastened) and also showing in phantom the work platform (which is fastened to the other side of the load sensor mounting)
Figure 8:
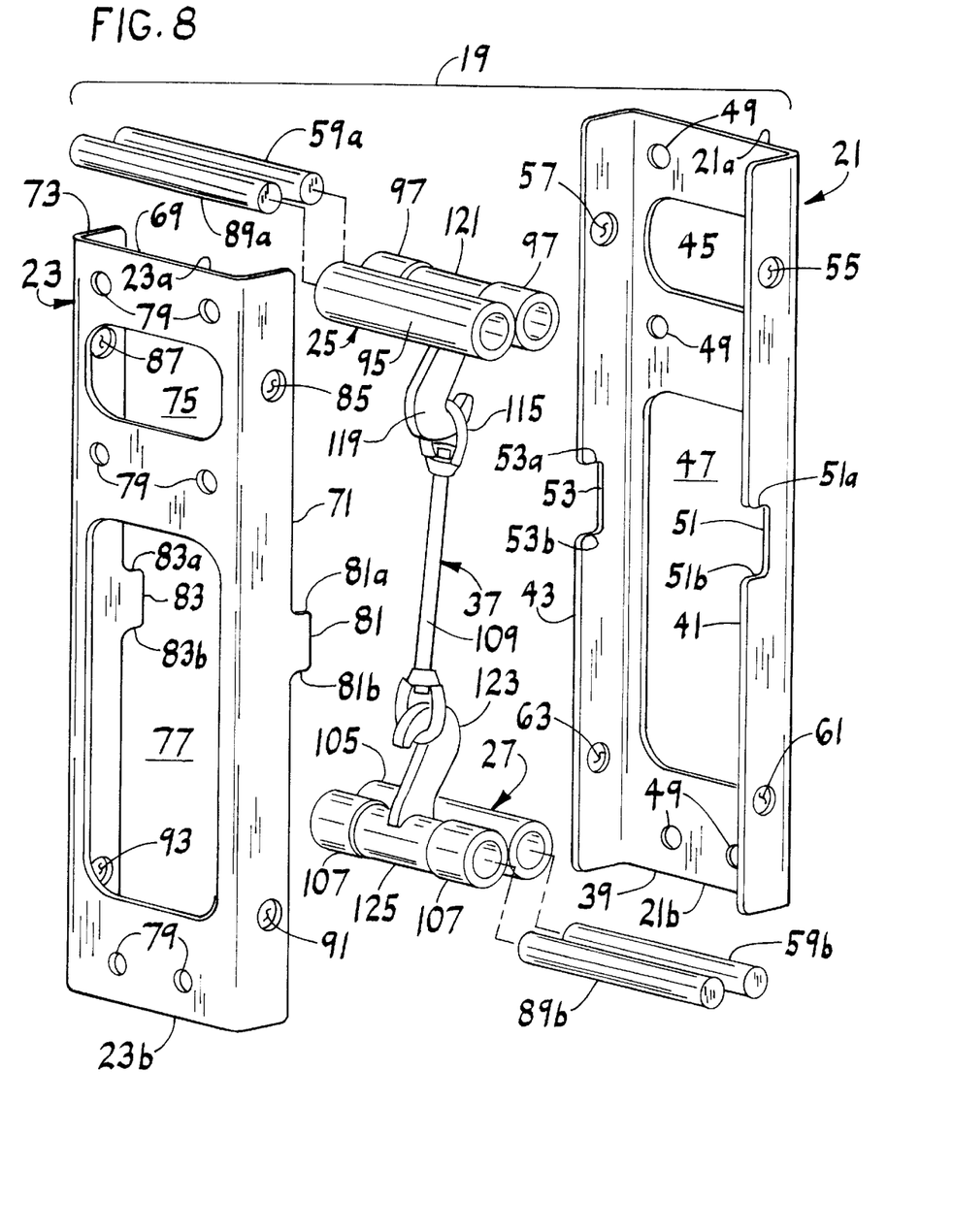
FIG. 8 is an exploded view of the load sensor mounting per se in perspective.

In the preferred embodiment, the side member 21 of the load sensor mounting 19 comprises an elongate metal bracket generally of channel shape in transverse (horizontal) cross-section, thereby having a web 39 and flanges 41 and 43 extending at right angles to the web (FIG. 8). The web has openings indicated at 45 and 47 and holes 49 for reception of fasteners such as indicated at 50 (see FIG. 7) for fastening it in position extending vertically on the framework 11. The flanges 41 and 43 have notches indicated at 51 and 53 (FIG. 8) generally midway of the length (height) thereof, the notch 51 having upper and lower horizontal edges 51a, 51b and the notch 53 having upper and lower horizontal edges 53a, 53b. Adjacent the upper end 21a of the bracket 21, its flanges 41, 43 have holes 55 and 57 20 in transverse alignment for reception of a pin 59a for establishing the pivotal connection 29. Adjacent the lower end 21b of bracket 21 its flanges 41, 43 have holes 61 and 63 in transverse alignment for reception of a pin 59b for establishing the pivotal connection 33.

The side member 23 of the load sensor mounting 19 also comprises an elongate metal bracket generally of channel shape in transverse (horizontal) cross-section, thereby having a web 69 and flanges 71 and 73 extending at right angles to the web (FIG. 8). The web has openings indicated at 75 and 77 and holes 79 for reception of fasteners such as shown at 50 for fastening it in position extending vertically on the work platform 3. The flanges 71 and 73 have noses indicated at 81 and 83 generally midway of the length (height) thereof, the nose 81 having upper and lower horizontal edges 81a, 81b and the nose 83 having upper and lower horizontal edges 83a, 83b. Adjacent the upper end of the bracket 23, its flanges 71, 73 have holes 85 and 87 in transverse alignment for reception of a pin 89a for establishing the pivotal connection 29. Adjacent the lower end of bracket 23 its flanges 71, 73 have holes 91 and 93 in transverse alignment for reception of a pin 89b for establishing the pivotal connection 35.

The aforesaid third (upper) member 25, which constitutes a link linking the work platform bracket 23 and the bracket 21 adjacent the upper ends of the brackets comprises a sleeve or tube 95 having a pair of eyes thereon each designated 97 spaced lengthwise thereof on an axis parallel to the axis of the sleeve. The sleeve and eyes are of suitable metal, each eye being welded to the sleeve by welding, as indicated at 25w (FIG. 5), the effective length of the upper member or link 25 (the distance between the axis of the eyes 97 and the axis of the sleeve 95), being short in relation to the height of the brackets 21, 23 and the vertical distance between the axes of the pins 59a, 59b and 89a, 89b. The sleeve and eyes could be made integral instead of being welded together. Each pin 59a, 59b, 89a, 89b is retained in the respective pin holes by means of C-clips 99 snapped into annular grooves in the pins adjacent their ends.

The aforesaid fourth (lower) member 27, which constitutes a link linking the work platform bracket 23 to the bracket 21 adjacent the lower ends of the brackets, like link 25 comprises a sleeve or tube 105 having a pair of eyes thereon each designated 107 spaced lengthwise thereof on an axis parallel to the axis of the sleeve. Here again, the sleeve and eyes are of suitable metal, each eye being welded to the sleeve by welding, as indicated at 27w (FIG. 6), the effective length of the upper member or link 27 (the distance between the axis of the eyes 107 and the axis of the sleeve 105), being short in relation to the height of the brackets 21, 23 and the vertical distance between the axes of the pins 59a, 59b and 89a, 89b. Here again, the sleeve 105 and eyes 107 could be made integral instead of being welded together.

The upper link 25 has its eyes 97 pivotally encircling the pin 59a at the upper end of bracket 21 and its sleeve 95 pivotally encircling the pin 89a at the upper end of bracket 23. The lower link 27 has its eyes 107 pivotally encircling the pin 89b at the lower end of bracket 23 and its sleeve 105 pivotally encircling the pin 59b at the lower end of bracket 21. The arrangement is such as to permit some degree of up and down movement (essentially vertical movement) of bracket 23 relative to bracket 21 in the direction of the length of bracket 23. Since the upper and lower links 25 and 27 are identical (and of the same effective length), permitted movement of bracket 23 is generally vertical in the direction of its length and parallel to bracket 21. The effective length of each of the upper and lower links 25, 27 (which is relatively short) is such that bracket 23 is disposed in close proximity to bracket 21 with the edges of the flanges 71, 73 of bracket 23 close to the edges of flanges 51, 53 of bracket 21 and with the noses 81, 83 on flanges 71, 73 extending into the notches 51, 53 in flanges 51, 53.

Figure 13:
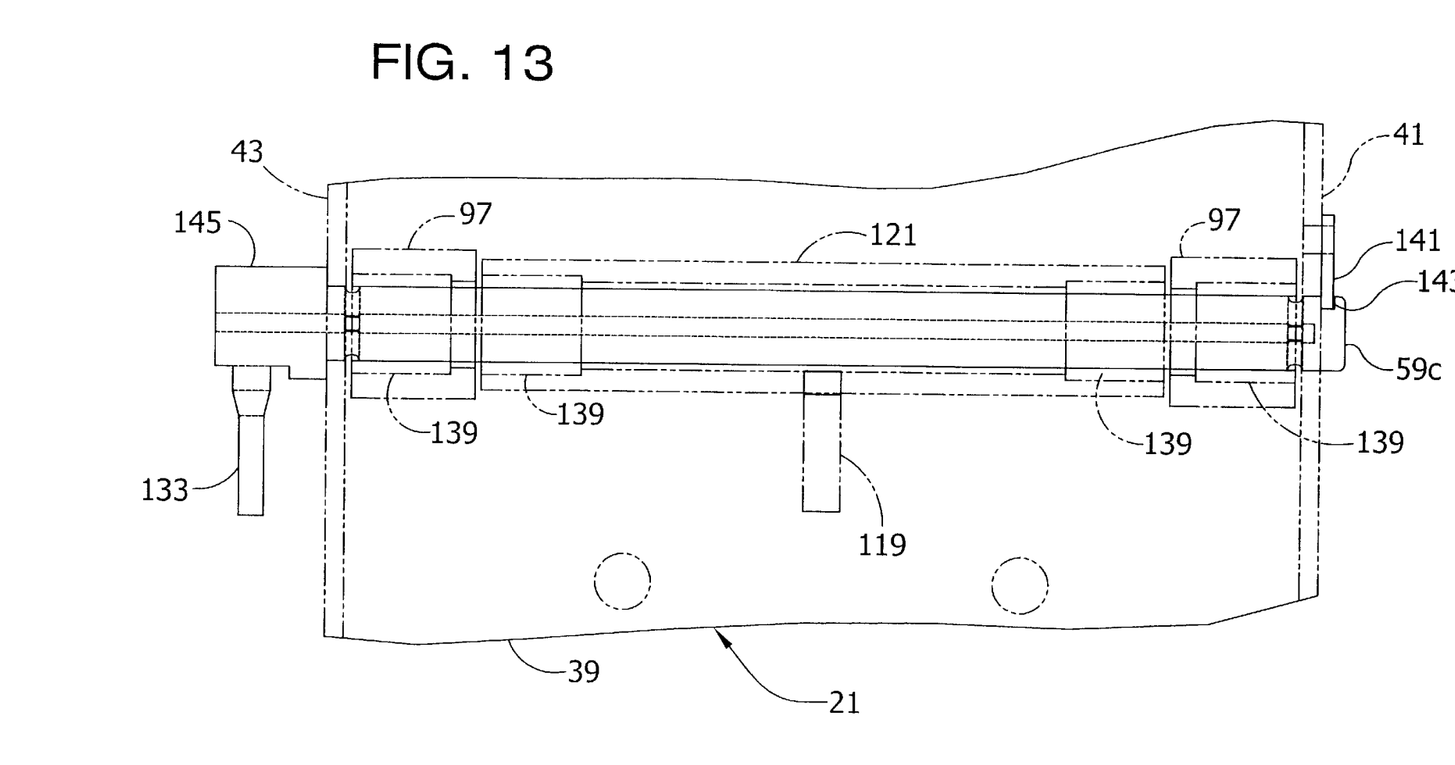
FIG. 13 is a fragmentary elevation illustrating the mounting of the FIG. 10 pin.
Figure 14:
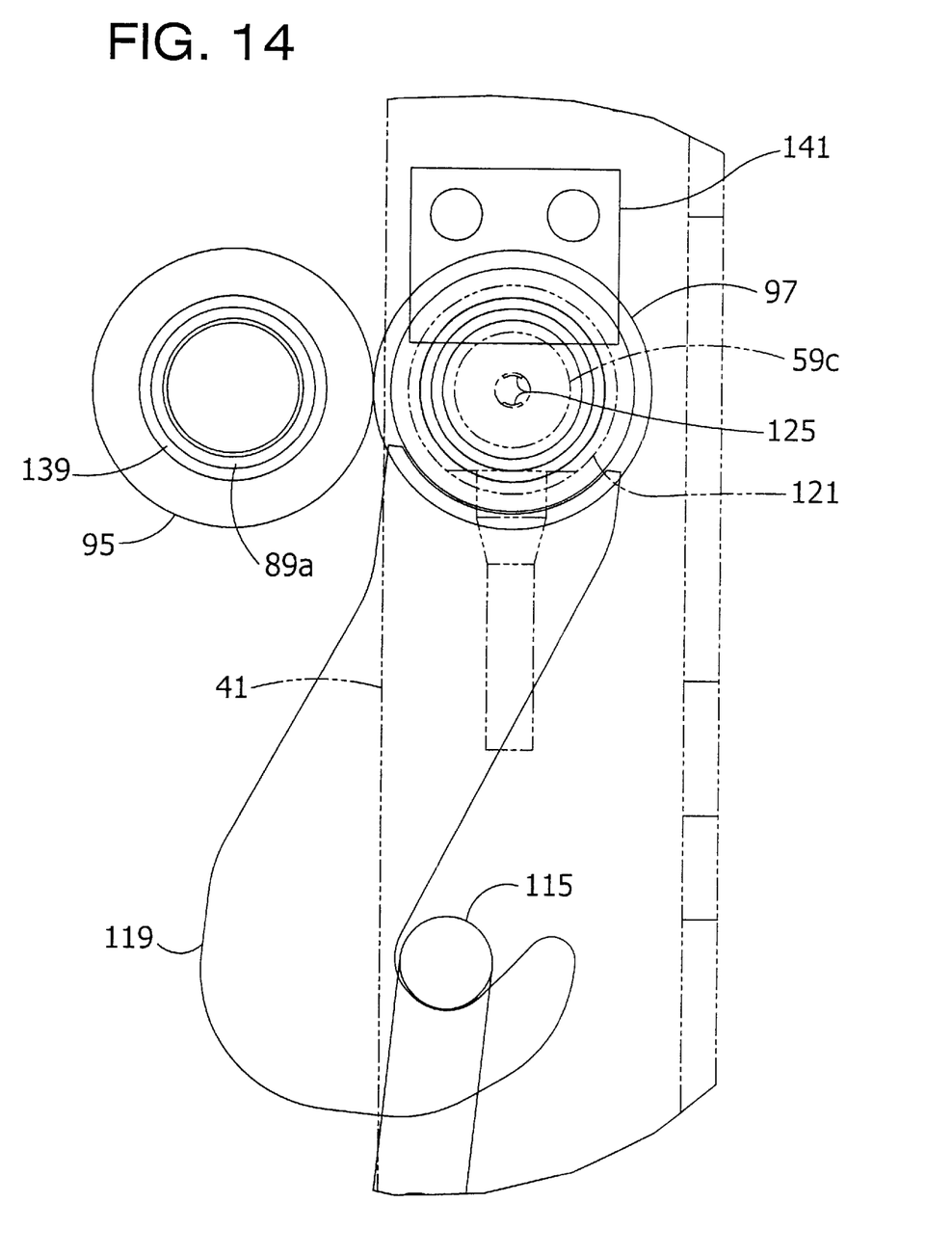
FIG. 14 is generally an end view of FIG. 13.

Suitable bushings (139 in FIG. 13) are provided in sleeves 95, 105 and in eyes 97, 107 to insure smooth rotation of these members relative to pins 89a, 89b, 59a, 59b. The bushings may be self-lubricating bushings, bronze bushings or other types of suitable bushings. Roller bearings may also be used.

Figure 9:
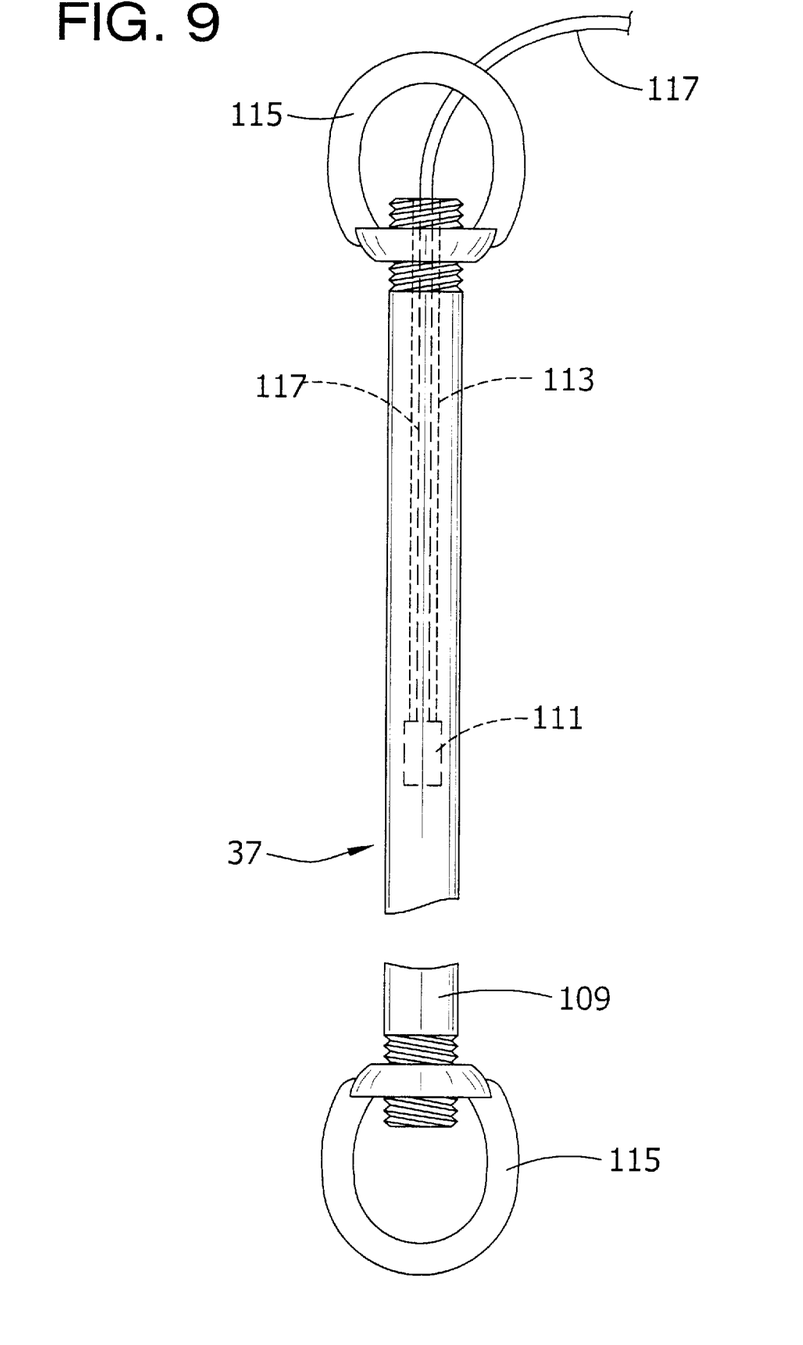
FIG. 9 is a view, partly broken away, of a load cell per se of the mounting.
Figure 10:
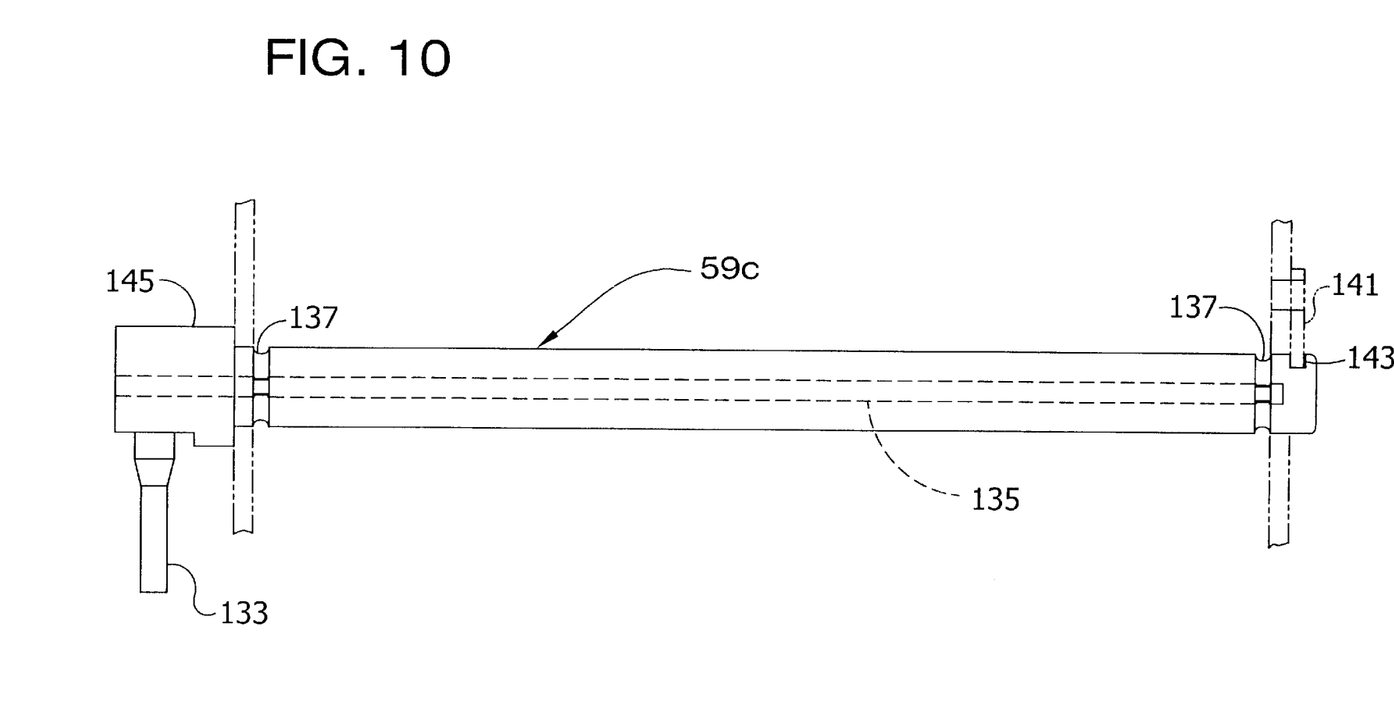
FIG. 10 is a view of a shear-sensing pin which may be used in the load sensor mounting.
Figure 11:
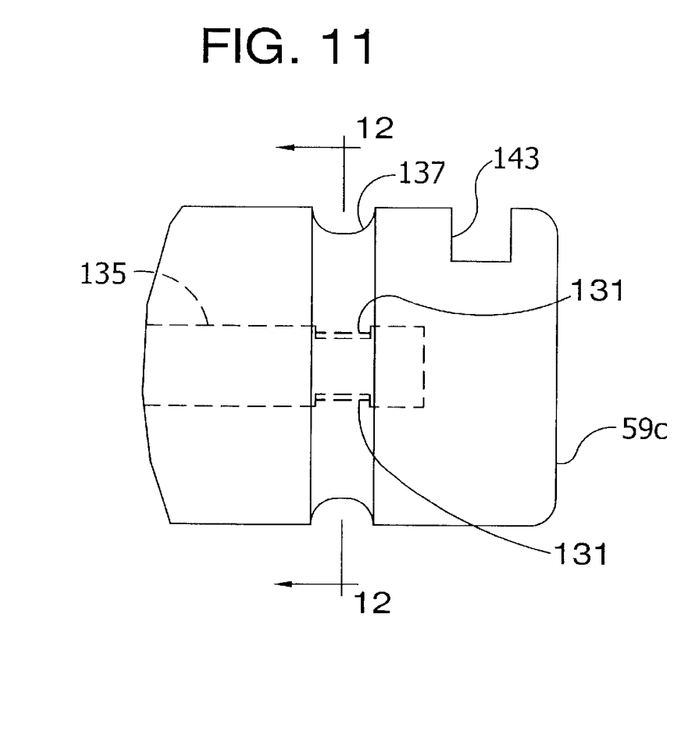
FIG. 11 is an enlarged fragment of FIG. 10.

Referring to FIGS. 7 and 8, the interconnection 37 is a tension-taking interconnection pivotally connected at one end constituting its upper end to the boom end bracket 21 and at its other and lower end to the work platform bracket 23. Preferably, the tension-taking interconnection comprises a commercially available elongate tension load cell 109, more particularly a Model ST-F tension load cell sold by Strainsert, Union Hill Industrial Park, West Conshohocken, Pa., 19428. For a work platform weighing generally from 100 to 200 lbs. which is to carry safely loads up to 500 lbs. The Strainsert Model ST-F load cell is one comprising a ⅜ inch diameter 16 NC 6½% inch long rod (capable of safely carrying at least 4500 lbs.) having load-sensing instrumentation comprising a strain gauge 111 (FIG. 9) incorporated therein at the inner end of an axial bore 113 extending from one end thereof (the upper end as illustrated). The load cell 109 is generally similar to the force sensing stud disclosed in U.S. Pat. No. 2,873,341 issued Feb. 10, 1959 entitled Electric Strain Gauge and Resistance Units Therefor except for having eyes 115 threaded on each end. The strain gauge is connected in an electrical circuit, wiring thereof being indicated at 117, and acts to provide an electrical output signal via the wiring representative of the strain to which the load cell is subjected and thus serving as a measure of the weight of the work platform 3 and load carried thereby, and utilized for detecting the load on the work platform (e.g. loading thereof totaling more than 500 lbs.). The wiring extends from the upper end of the load cell through the opening 47 in bracket 21.

The upper eye 115 is hooked on a hook 119 extending down from a sleeve 121 (a short metal tube) pivotally mounted on pin 59 a between the eyes 97 of the upper link 25, and the lower eye 115 is hooked on a hook 123 extending up from a similar sleeve 125 pivotally mounted on pin 89b between the eyes 107 of the lower link 27. Thus, the interconnection 37 of linkage 20 may generally be considered as comprising (in order from the top of the mounting 19 down as viewed in FIG. 8) sleeve 121 on pin 59 a, upper hook 119, upper eye 115, load cell 109, lower eye 115, lower hook 123, sleeve 125 and pin 89 b. In the absence of a load on the work platform, the interconnection holds the bracket 23 carrying the work platform in the position wherein the upper edges 81a, 83a of the noses 81 and 83 on flanges 71 and 73 of the bracket 23 are slightly (e.g. 0.13 inch) spaced down from the upper edges 51a and 53a of notches 51 and 53 and the lower edges 81b and 83b of the noses 81, 83 and are spaced a somewhat greater but still small distance (e.g. 0.25 inch) up from the lower edges 51b and 53b of the notches. Said edges act as interengageable stops (on brackets 21 and 23 ) limiting the up and down movement of bracket 23 relative to bracket 21.

The load cell 109 of interconnection 37 continuously monitors the loading of the work platform 3, being stressed and strained in tension according to the weight of the platform and the loading which the platform is subject to (e.g. the weight of a workman or workmen on the platform plus items thereon and dynamic forces), acting to transmit electrical current via wiring 117 depending in value on the strain in the load cell and thus depending in value on the loading. Overloading, for example, loading in excess of 700 lbs. static load (200 lbs. platform weight) results in the current being of overload-detecting value, thereupon acting via suitable and well-known means to trigger an audible overload alarm, such as a siren, or a visual alarm, such as a red light, or to effect movement of the work platform to a safe position. An alternative is to have the load cell output interfaced with a computer acting to trigger the alarm or to effect movement of the work platform to a safe position if the load cell detects an overload condition more than a predetermined portion of a predetermined period of time (e.g. 50% of such period). The latter mode may be preferred on account of the platform being subject to dynamic load exceeding whatever static load is set as the overload (e.g. 700 lbs. including platform weight of 200 lbs.).

With the effective length of each of links 25 and 27 short in relation to the distance between the axes of pins 59a, 59b (and the distance between the axes of pins 89a, 89b ), preferably less than 50% of that distance, and more preferably less than 25% and most preferably less than 15% (e.g., 12.5%), the load cell 109 is inclined off vertical only a small angle and accurately reflects the loading. Thus, the tension on the load cell is generally equal to the loading divided by the cosine of the angle off vertical, e.g. for an angle of 5° off vertical for the load cell, the tension thereon is the load divided by 0.996. The mounting 19 is sufficiently rigid to forces tending to twist the boom about its axis (e.g., forces resulting from a person moving from side to side on the work platform) that the load cell 109 is not affected by such forces and essentially does not react to them.

It will be observed from the foregoing that links 21, 23, 25 and 27 form a parallelogram linkage, with the upper and lower links being short compared to the side links 25 and 27. It will be understood that other four-member linkages may also be used to practice the present invention, and that the lengths of the respective links may vary. For example, the upper and lower links may be substantially longer than links 21 and 23 as shown in the drawings. Also, the construction of the links may vary from that shown. Further, the construction of the interconnection 37 may also vary. For example, the load cell 109, eyes 115, hooks 119, 123 and sleeves 121, 125 could be formed as an integral member machined from a piece of suitable metal. Instrumentation other than strain gage 111 could also be used for sensing the tension load in the linkage 20.

As an adjunct to the above, the load sensor mounting 19 may be modified to detect not only a vertical load on the load support 3 but also an overhung load on the load support. This modification has particular (albeit not exclusive) application to forklifts, such as a rough terrain forklift, where loads substantially overhanging the tines of the forklift may create large moment forces tending to tip the forklift. In these circumstances, it is desirable to measure such forces to prevent tipping. As illustrated in FIGS. 10–14, the interconnection 37 of the load sensor mounting 19 is modified so that the pin 59a of the bracket 23 is instrumented to measure the shearing force thereon. (This shear force is indicative of the tension in the upper member 25 and thus the magnitude of the overhung load). The pin used in place of 59a, designated 59c in FIGS. 10–14, has strain gauges 131 incorporated therein connected in an electrical circuit the wiring of which is indicated at 133 extending out of one end of the pin through an axial bore 135 in the pin. In the event the strain gages 131 sense a shear force indicative of an overhung load which exceeds a predetermined maximum load, an alarm or lift shut-off is triggered.

Figure 12:
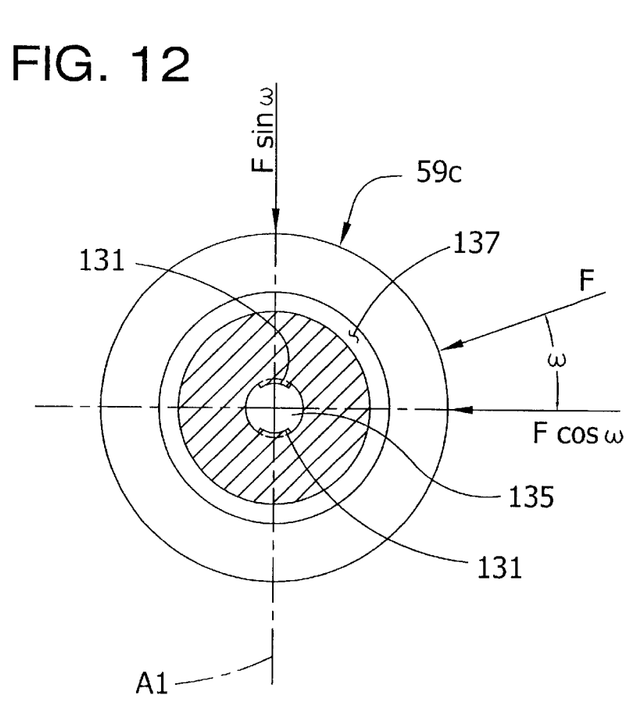
FIG. 12 is a cross-section generally on line 12—12 of FIG. 11.

As shown in FIG. 12, the preferred embodiment includes four strain gages 131, two at each end of the pin 59c arranged on diametrically opposite upper and lower sides of the pin on a neutral vertical axis A1 of bending moment. These strain gages measure the horizontal force component of a shear force F exerted on the pin at an angle ω (FIG. 12). This force component (F cos ω) is representative of the moment or "overhung" load on the load support 3. The pin 59c has a circumferential groove 137 adjacent each of its ends at the location of the strain gages 131 to provide a reduced pin cross-section for sensing the shear forces with greater accuracy. It is important that these grooves 137 (and the associated strain gages 131) be located at positions where the shear load is greatest, such as the locations shown in FIG. 13 where the ends of the eyes 97 (and bushings 139 therein) are centered widthwise of the grooves. The pin is held in this position by a keeper plate 141 fastened to a flange 41 of side member 21 of the load sensor mounting 19. An edge of the keeper plate 141 is received in a slot 143 in the pin 59c. The opposite end of the pin has an enlarged head 145 which engages flange 43 of the side member 21, the end result being that the pin is held in fixed axial position in which the ends of the eyes 97 and/or bushings 139 are generally in registry with the grooves 137 in the pin. The keeper plate 141 also holds in the pin 59c in a predetermined angular position in which the neutral axis A1 of bending moment is generally vertical to provide an accurate reference from which to quantify the output signals of the strain gages 131. (When the strain gages are positioned on a neutral axis which is vertical, the strain gages will sense only the horizontal component (F cos ω) of shear force on the pin, which is the component representative of the overhung load; the strain gages will not sense the vertical component (F sin ω) of the force F. An instrumented pin suitable for use is commercially available from Strainsert, Union Hill Industrial Park, West Conshohocken, Pa., 19428.

Figure 15:
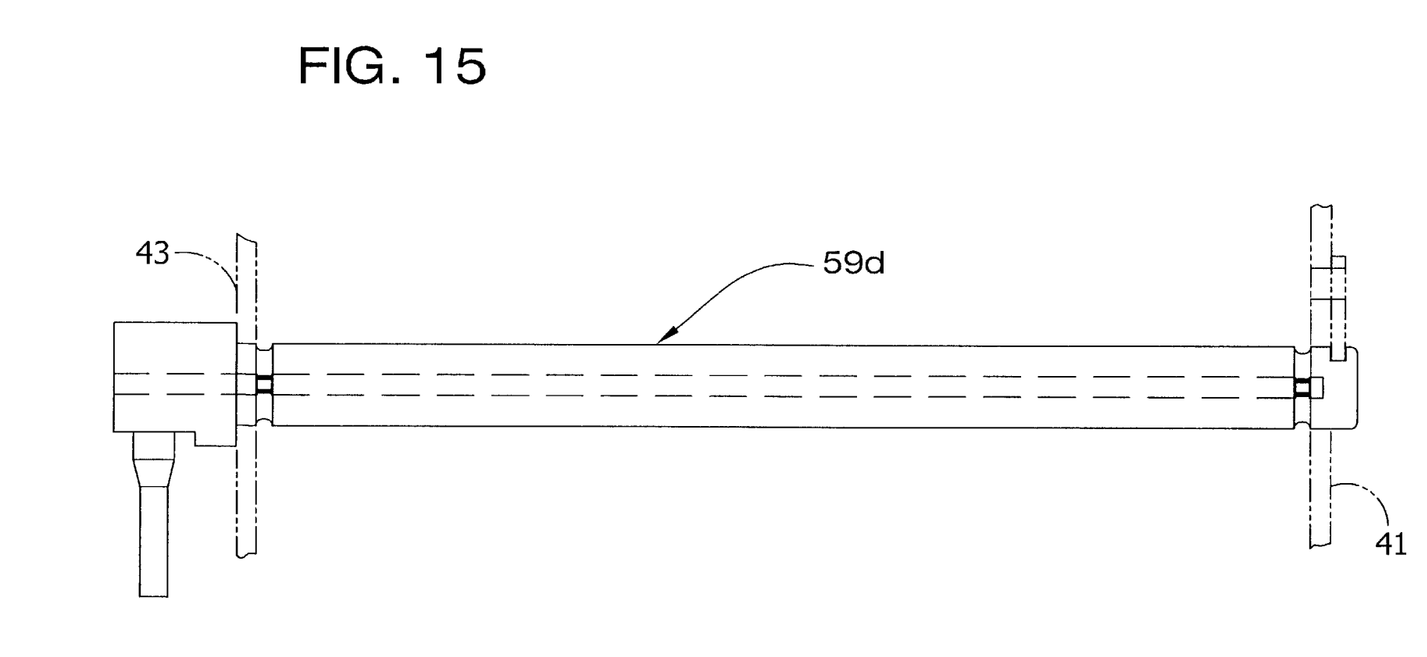
FIG. 15 is a view of a modification of the FIG. 10 pin used in a modification of the mounting of FIGS. 1–8.
Figure 16:
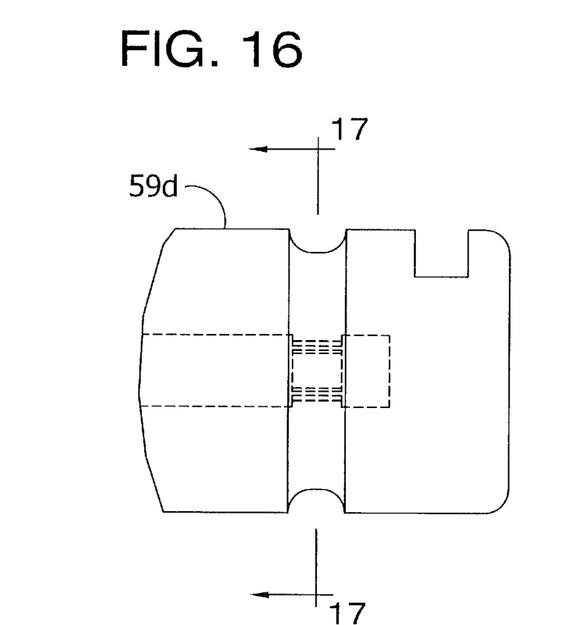
FIG. 16 is an enlarged fragment of FIG. 15.
Figure 17:
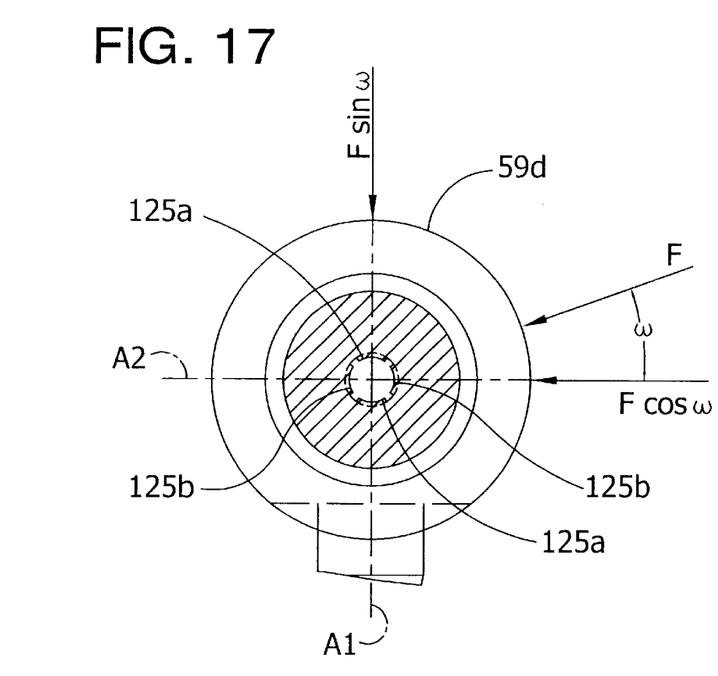
FIG. 17 is a cross-section generally on line 17—17 of FIG. 16.

FIGS. 15–17 illustrate an alternative embodiment capable of measuring both the weight of the load on the platform and the "overhung" load, but without the need to use a tension load cell 109. In this embodiment, pin 59c is replaced by an instrumented pin 59d which is similar to pin 59c except that there are two pairs of strain gages at each end of the pin, a pair of upper and lower strain gages 125a for measuring the horizontal component (F cos ω) of any shear force on the pin, indicative of the overhung load, and a pair of left and right strain gages 125b for measuring the vertical component (F sin ω) of any such shear force indicative of the weight of the load on the load support 3. The upper and lower strain gages 125a are located on a vertical neutral axis A1 of bending moment, and the left and right strain gages 125b are located on a horizontal neutral axis A2 of bending moment. In this embodiment the load cell 109 is replaced by a simple structural member which functions solely to support the load of the platform. An instrumented pin 59d of suitable manufacture may be obtained from the aforementioned Strainsert company.

It will be understood that the interconnection 37 between the first and second members 21, 23 described can have configurations other than those described above without departing from the scope of this invention, which is intended to cover any type of linkage interconnection between the first and second members 21, 23 instrumented for sensing the load on the work platform 3 (i.e., the load support). Further, the instrumentation used for sensing the loads may be different from the strain gage systems described above. For example, the instrumentation could be a spring system comprising a spring (in lieu of a tension member such as 109) and a device for measuring the deflection of the spring under a load on the work platform 3. The measuring device could be a dial load indicator, or a linear potentiometer or encoder providing a digital readout of the load, or a set-point device such as a proximity switch for signaling an alarm or shut-off of the machine in the event of a predetermined load condition. Another method for measuring the force in the diagonal would be to use a hydraulic cylinder with a pressure transducer or pressure switch.

Regardless of how the load is sensed, the load sensor of the present invention can have various outputs, as noted above. For example, the output of the load sensor can be displayed as an analog or digital readout of the actual load on the platform, or it can be used to signal an alarm or to shut off the machine if a predetermined load condition is met.

The load sensing system represents an improvement over prior systems. Not only is the system more economical, due in large part to the fact that only a single bracket and load sensor is used, it is also accurate and capable of measuring various load conditions, including the weight on the work platform and the overhung load.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. A load lift comprising a lifter, a linkage on the lifter carrying a load support for movement therewith to different elevations, said linkage comprising a first member carried by the lifter, a second member carrying the load support, said first and second members constituting side members of the linkage extending generally vertically, a third member constituting an upper member of the linkage pivotally connected to the first and second members, a fourth member constituting a lower member of the linkage pivotally connected to the first and second members, and an interconnection between said first and second members holding up said second member and load support, said lifter further comprising instrumentation for sensing the loading on said linkage indicative of the loading on said load support;

wherein said first member comprises an elongate first bracket attached to the lifter extending generally vertically and movable up and down with the lifter in the direction of its length and generally vertically throughout its up and down movement, said second member comprising an elongate bracket attached to the load support extending generally vertically generally parallel to the first bracket between the first bracket and load support, said third member comprising an upper link pivotally connected to said brackets and said fourth member comprises a lower link pivotally connected to said brackets;

wherein said upper link is pivotally connected to said brackets on upper pins mounted on said brackets and said lower link is pivotally connected to said brackets on lower pins mounted on said brackets;

wherein each bracket is of channel shape in horizontal cross section having a web and flanges extending from the web, each of the pins extending on a generally horizontal axis between the flanges, each upper and lower link comprising a sleeve and a pair of eyes spaced lengthwise of the sleeve on an axis parallel to that of the sleeve, the upper link having the eyes thereof on the upper pin of the first bracket and the sleeve thereof on the upper pin of the second bracket, the lower link having the eyes thereof on the lower pin of the second bracket and the sleeve thereof on the lower pin of the first bracket, the interconnection having a pivotal connection with the upper pin of the first bracket between the eyes of the upper link and a pivotal connection with the lower pin of the second bracket between the eyes of the lower link.

2. An aerial work platform lift comprising a boom carrying a work platform pivotable to move the work platform to different elevations, said boom having an end carrying the work platform for pivotal movement of the work platform about a generally horizontal axis to maintain the work platform generally level as it is moved up and down by the boom, a linkage on the boom end carrying the work platform, said linkage comprising a generally vertical first bracket attached to said boom end and movable up and down with the boom in the direction of length of said first bracket, a second bracket attached to the work platform extending generally parallel to the first bracket between the first bracket and work platform, an upper link pivotally connected to said brackets, a lower link pivotally connected to said brackets, an interconnection between the first bracket and the second bracket holding up said second bracket and work platform, and instrumentation for sensing the loading on said linkage indicative of the loading on the work platform;

wherein said upper link is pivotally connected to said brackets on upper pins mounted on said brackets and said lower link is pivotally connected to said brackets on lower pins mounted on said brackets;

wherein each bracket is of channel shape in horizontal cross section having a web and flanges extending from the web, each of the pins extending on a generally horizontal axis between the flanges, each upper and lower link comprising a sleeve and a pair of eyes spaced lengthwise of the sleeve on an axis parallel to that of the sleeve, the upper link having the eyes thereof on the upper pin of the first bracket and the sleeve thereof on the upper pin of the second bracket, the lower link having the eyes thereof on the lower pin of the second bracket and the sleeve thereof on the lower pin of the first bracket, the interconnection having a pivotal connection with the upper pin of the first bracket between the eyes of the upper link and a pivotal connection with the lower pin of the second bracket between the eyes of the lower link.

3. A load sensor mounting for the load support of a load lift having a lifter, said mounting comprising a linkage including a first side member for attachment to the lifter in generally vertical position, a second side member for attachment to the load support in generally vertical position, an upper member pivotally connected to the side members, a lower member pivotally to the side members, an interconnection between the side members for holding up the second side member and the load support, said mounting further comprising instrumentation for sensing the loading on said linkage indicative of the load on said load support;

wherein said first side member comprises an elongate first bracket attached to the lifter extending generally vertically and movable up and down with the lifter in the direction of its length and generally vertically throughout its up and down movement, said second side member comprises an elongate bracket attached to the load support extending generally vertically generally parallel to the first bracket between the first bracket and load support, said upper member comprising an upper link pivotally connected to said brackets and said lower member comprises a lower link pivotally connected to said brackets;

wherein said upper link is pivotally connected to said brackets on upper pins mounted on said brackets and said lower link is pivotally connected to said brackets on lower pins mounted on said brackets;

wherein each bracket is of channel shape in horizontal cross section having a web and flanges extending from the web, each of the pins extending on a generally horizontal axis between the flanges, each upper and lower link comprising a sleeve and a pair of eyes spaced lengthwise of the sleeve on an axis parallel to that of the sleeve, the upper link having the eyes thereof on the upper pin of the first bracket and the sleeve thereof on the upper pin of the second bracket, the lower link having the eyes thereof on the lower pin of the second bracket and the sleeve thereof on the lower pin of the first bracket, the interconnection having a pivotal connection with the upper pin of the first bracket between the eyes of the upper link and a pivotal connection with the lower pin of the second bracket between the eyes of the lower link.

* * * * *